Sept. 2, 1958  C. D. STRICKER  2,850,448
APPARATUS FOR ELECTROLYTICALLY POINTING WIRE
Filed Feb. 18, 1955
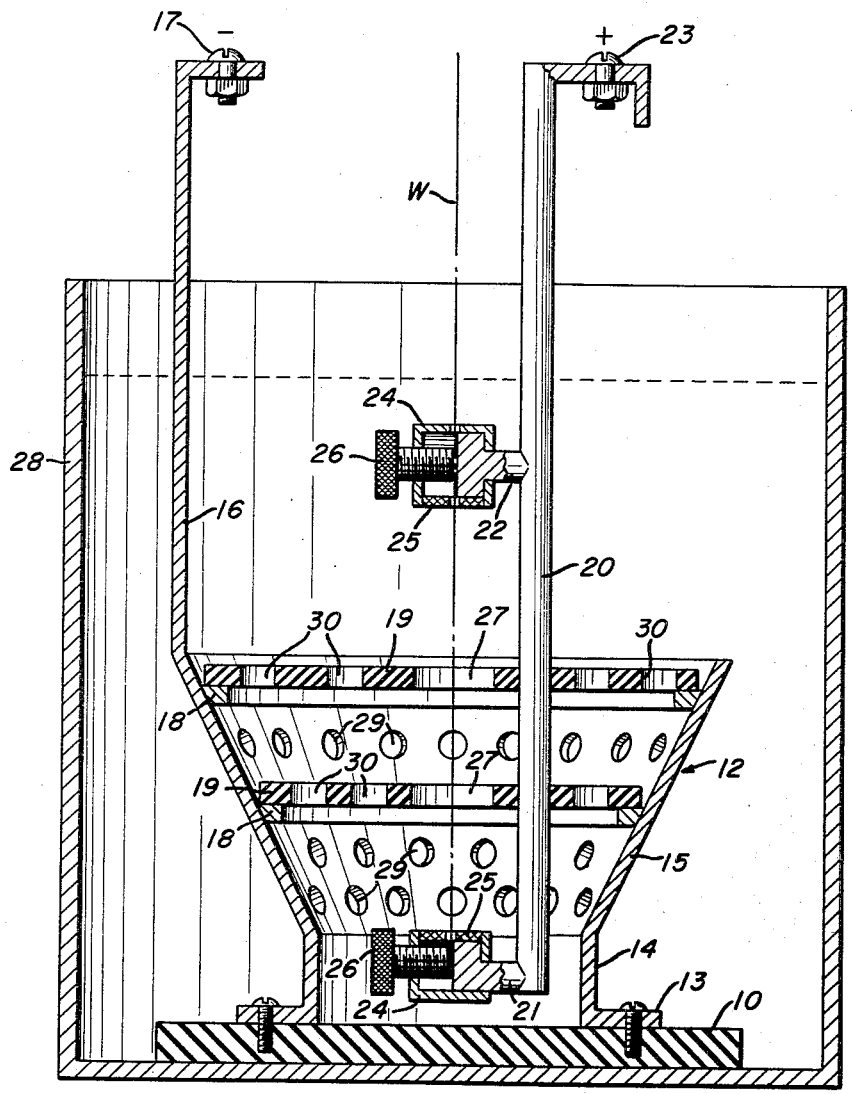
INVENTOR:
CHARLES D. STRICKER,
BY: Donald G. Dalton
his Attorney.

2,850,448

Patented Sept. 2, 1958

2,850,448

APPARATUS FOR ELECTROLYTICALLY POINTING WIRE

Charles D. Stricker, Warrensville Heights, Ohio, assignor to United States Steel Corporation, a corporation of New Jersey Application February 18, 1955, Serial No. 489,134

5 Claims. (Cl. 204—242)

This invention relates to apparatus and methods for forming points on the ends of wires.

An object of the invention is to provide an improved apparatus and method which are capable of forming smooth sharp points by electrolytic means.

A further object is to provide an improved electrolytic apparatus and method for pointing wires in which the anode rack and wire have multiple contacts situated below the electrolyte level, thereby enabling the liquid electrolyte to cool the contacts and permitting extremely high current densities, as well as minimizing "necking down" at the liquid interface.

A further object is to provide an improved electrolytic apparatus and method for pointing wires in which the cathode is in the shape of an inverted frusto-conical shell and the wire anode is positioned along the central axis thereof to afford a progressive increase in the distance between the cathode and anode away from the end of the wire.

In accomplishing these and other objects of the invention, I have provided improved details of structure, a preferred form of which is shown in the accompanying drawing, in which the single figure is a vertical sectional view of a wire pointing apparatus constructed in accordance with my invention.

The apparatus comprises a rigid base 10 of insulating material and a metal cathode 12 preferably of copper fixed thereto. The cathode includes a supporting flange 13, a short upright cylindrical shell portion 14, an inverted frusto-conical shell portion 15, and an upright bar 16 which carries a negative terminal 17. The frusto-conical portion 15 carries a plurality of internal supporting lugs 18 on which rest a pair of vertically spaced rigid plates 19 of insulating material. These plates support a vertically extending anode rack 20 of metal, such as copper, which has an insulating coating, such as a suitable lacquer or varnish. The rack 20 carries a lower contact arm 21 located within the cylindrical portion 14 of the cathode, an upper contact arm 22 located above the upper plate 19, and a positive terminal 23 at its upper end.

The two contact arms 21 and 22 are of essentially similar construction. Each is encased in a housing 24 of insulating material, and preferably their opposed faces carry pads 25 of lead-silver alloy which also have insulating coatings. These pads are insoluble in the electrolyte and thus prolong the life of the rack. The contact arms contain apertures located on the central axis of the cathode 12 and adapted to position a wire W on this axis. The contact arms also carry set screws 26 of rigid insulating material for fixing the wire in said apertures and pressing it into tight electrical contact with the arms. The plates 19 have central apertures 27 to accommodate the wire.

The assembly of the base 10, cathode 12, plates 19, anode rack 20 and wire W is housed in a vessel 28 which contains electrolyte to a level above the upper contact arm 22. The electrolyte preferably is a solution of 15 to 30 percent sulfuric acid, although it is apparent that many alternatives are possible. The negative and positive terminals 17 and 23 are connected to a suitable direct current source. The cathode 12 and plates 19 contain a plurality of apertures 29 and 30 for the purpose of allowing the electrolyte to circulate freely and gases to escape.

According to my wire pointing method, a wire W is installed in the apparatus as just described and direct current is applied across the terminals 17 and 23. This current is transmitted to the wire through both contact arms 21 and 22. The distance which the current flows through the electrolyte between the anode and cathode increases progressively from the bottom of the frusto-conical portion 15 to the top thereof. Consequently current flow is greatest near the bottom and least near the top, and the extent to which the wire is attacked decreases progressively upwardly. Current densities of 100 to 200 amperes per square inch can be realized with most wire sizes. At such densities the time required to form a satisfactory point is greatly shortened over previous practices. For example, in pointing 0.065 inch stainless steel wire, a 30 percent reduction on a 6 inch point requires only 30 to 45 seconds. At the conclusion of the operation the portion of the wire within the lower contact arm 21 is discarded, the tip of the point being located immediately above this arm. Since current is introduced to the wire below the electrolyte level only, the wire does not carry appreciable current where it crosses the liquid interface. Consequently the accelerated attack which usually takes place on the wire in this region is avoided and there is little "necking down" and no weakening.

While I have shown and described only a single embodiment of my invention, it is apparent that modifications may arise. Therefore, I do not wish to be limited to the disclosure set forth but only by the scope of the appended claims.

I claim:

1. An apparatus for forming a point on the end portion of a wire comprising a vessel adapted to contain electrolyte, a cathode having a portion shaped as an inverted frusto-conical shell supported in said vessel, means located within said vessel for fixing a wire along the central axis of said cathode, and means for supplying direct current to said cathode and wire with the latter acting as an anode, the spacing between the cathode and wire increasing upwardly so that the density of current which flows from the cathode to the wire decreases progressively upwardly.

2. An apparatus for forming a point on the end portion of a wire comprising a vessel adapted to contain electrolyte, a cathode having a portion shaped as an inverted frusto-conical shell supported in said vessel, an anode rack extending into said vessel within said cathode, and means on said rack for supporting a wire along the central axis of said cathode and conducting electric current to the wire, and means for supplying direct current to said cathode and anode rack, the spacing between the cathode and wire increasing upwardly so that the density of current which flows from the cathode to the wire decreases progressively upwardly.

3. An apparatus for forming a point on the end portion of a wire comprising a vessel adapted to contain electrolyte, a cathode having a portion shaped as an inverted frusto-conical shell supported in said vessel, an anode rack supported in said vessel within said cathode, contact means on said rack within the vessel for supporting a wire along the central axis of said cathode and conducting electric current to the wire, and means for supplying direct current to said cathode and anode rack, the spacing between the cathode and wire increasing upwardly so that the density of current which flows from the cathode to the wire decreases progressively upwardly.

4. An apparatus for forming a point on the end portion of a wire comprising a vessel adapted to contain electrolyte, a cathode having a portion shaped as an inverted frusto-conical shell supported in said vessel, an anode rack supported in said vessel within said cathode, a pair of vertically spaced contacts carried by said rack within the vessel for supporting a wire along the central axis of said cathode and conducting electric current to the wire, and terminals on said cathode and said anode rack for supplying direct current to said cathode and wire with the latter acting as an anode, one of said contacts being approximately opposite the apex of the frusto-conical shell so that the density of current transmitted between the cathode and the wire decreases progressively upwardly from this contact.

5. An apparatus for forming a point on the end portion of a wire comprising a vessel adapted to contain electrolyte to a predetermined level, a cathode supported in said vessel and having a short length cylindrical shell portion at its lower end and an inverted frusto-conical shell portion thereabove, support means of electric insulation internally of said cathode, a vertically extending anode rack carried by said support means, lower and upper vertically spaced contact arms carried by said rack, said lower arm being located within the cylindrical portion of said cathode, said upper arm being located above said cathode, both said arms being within the vessel, said arms being adapted to support a wire along the central axis of said cathode and conduct electric current to the wire, and terminals on said cathode and said anode rack for supplying direct current to said cathode and wire with the latter acting as an anode, said lower arm being approximately opposite the apex of said frusto-conical portion so that the density of current transmitted between the cathode and the wire decreases progressively upwardly from the lower arm.

References Cited in the file of this patent

UNITED STATES PATENTS

| | | |
|---|---|---|
| 1,017,671 | Jenkins | Feb. 20, 1912 |
| 1,280,249 | Landry | Oct. 1, 1918 |
| 2,445,675 | Lang | July 20, 1948 |